(12) United States Patent
Shim et al.

(10) Patent No.: US 10,382,128 B2
(45) Date of Patent: Aug. 13, 2019

(54) MOBILE TERMINAL

(71) Applicant: LG ELECTRONICS INC., Seoul (KR)

(72) Inventors: Hongjo Shim, Seoul (KR); Gukchan Lim, Seoul (KR); Seonghyok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/746,256

(22) PCT Filed: Aug. 12, 2015

(86) PCT No.: PCT/KR2015/008441
§ 371 (c)(1),
(2) Date: Jan. 19, 2018

(87) PCT Pub. No.: WO2017/026554
PCT Pub. Date: Feb. 16, 2017

(65) Prior Publication Data
US 2018/0212679 A1 Jul. 26, 2018

(51) Int. Cl.
*H04B 10/00* (2013.01)
*H04B 10/116* (2013.01)
(Continued)

(52) U.S. Cl.
CPC ........... *H04B 10/116* (2013.01); *G06Q 20/14* (2013.01); *G06Q 20/3223* (2013.01);
(Continued)

(58) Field of Classification Search
CPC .... H04B 10/116; H04B 10/40; H04B 10/508; H04B 10/61; G06Q 20/14; G06Q 20/3223;
(Continued)

(56) References Cited

U.S. PATENT DOCUMENTS

| | | | | |
|---|---|---|---|---|
| 2012/0229699 A1* | 9/2012 | Mate | ..................... | H04N 5/2256 348/370 |
| 2014/0232903 A1* | 8/2014 | Oshima | ................ | H04N 5/3532 348/229.1 |

(Continued)

FOREIGN PATENT DOCUMENTS

| | | | | |
|---|---|---|---|---|
| KR | 10-1447602 B1 | 10/2014 | | |
| KR | 101447602 B1 * | 10/2014 | ........... | H04B 10/116 |

(Continued)

*Primary Examiner* — Mohammad R Sedighian
(74) *Attorney, Agent, or Firm* — Birch, Stewart, Kolasch & Birch, LLP

(57) ABSTRACT

A mobile terminal is disclosed. The mobile terminal for visible light communication, according to one embodiment of the present invention, uses visible light outputted from a lighting that turns on/off according to a preset condition, and the mobile terminal comprises: a light receiving unit for receiving visible light; a control unit for extracting, from the received visible light, data corresponding to the turning on/off; and a display unit for displaying information based on the extracted data, wherein the light receiving unit comprises at least one among an illuminance sensor, a first image sensor disposed on the front of the mobile terminal, and a second image sensor disposed on the back of the mobile terminal, and the control unit controls so that visible light communication is performed by using, among the illuminance sensor, the first image sensor, and the second image sensor, the sensor that receives visible light having the greatest signal strength.

20 Claims, 15 Drawing Sheets

(51) Int. Cl.
*H04B 10/508* (2013.01)
*H04B 10/61* (2013.01)
*H04M 1/725* (2006.01)
*G06Q 20/14* (2012.01)
*G06Q 20/32* (2012.01)
*H04B 10/40* (2013.01)
*H04L 7/00* (2006.01)
*H04W 56/00* (2009.01)
*G06F 3/0482* (2013.01)
*H04W 88/06* (2009.01)

(52) U.S. Cl.
CPC ........... *H04B 10/40* (2013.01); *H04B 10/508* (2013.01); *H04B 10/61* (2013.01); *H04L 7/0075* (2013.01); *H04M 1/725* (2013.01); *H04W 56/0015* (2013.01); *G06F 3/0482* (2013.01); *H04W 88/06* (2013.01)

(58) Field of Classification Search
CPC .... G06F 3/0482; H04L 7/0075; H04M 1/725; H04W 56/0015; H04W 88/06

USPC ........................................................ 398/118
See application file for complete search history.

(56) References Cited

U.S. PATENT DOCUMENTS

| | | | |
|---|---|---|---|
| 2014/0240540 A1* | 8/2014 | Kim | H04N 5/2258 348/231.99 |
| 2014/0280316 A1 | 9/2014 | Ganick et al. | |
| 2015/0009349 A1* | 1/2015 | Kim | H04N 5/2258 348/218.1 |
| 2015/0098709 A1 | 4/2015 | Breuer et al. | |
| 2015/0189149 A1* | 7/2015 | Oshima | H04N 5/23203 348/211.1 |

FOREIGN PATENT DOCUMENTS

| | | |
|---|---|---|
| WO | WO 2013/069963 A1 | 5/2013 |
| WO | WO 2015/115717 A1 | 8/2015 |

* cited by examiner

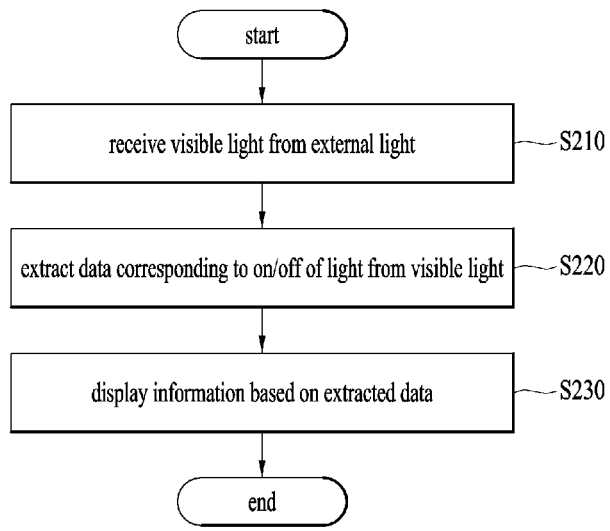
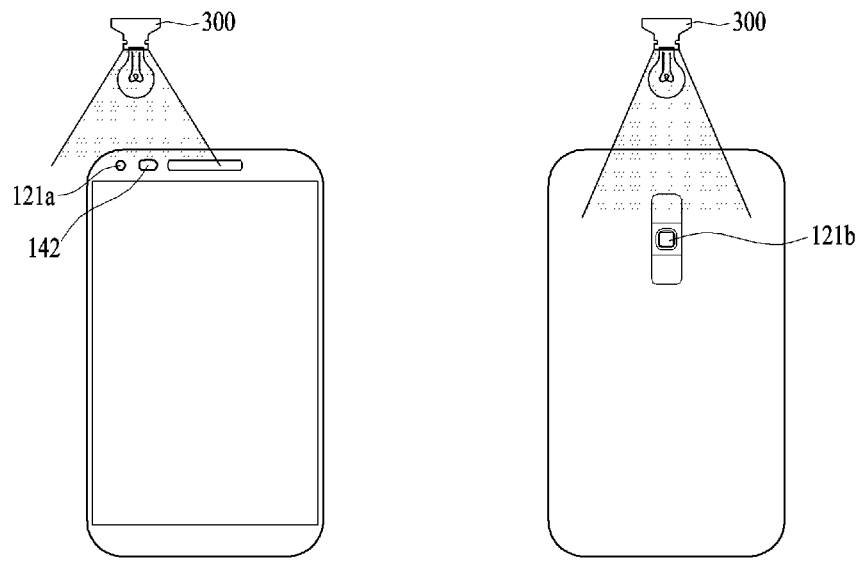

(a)          (b)

(a)  (b)

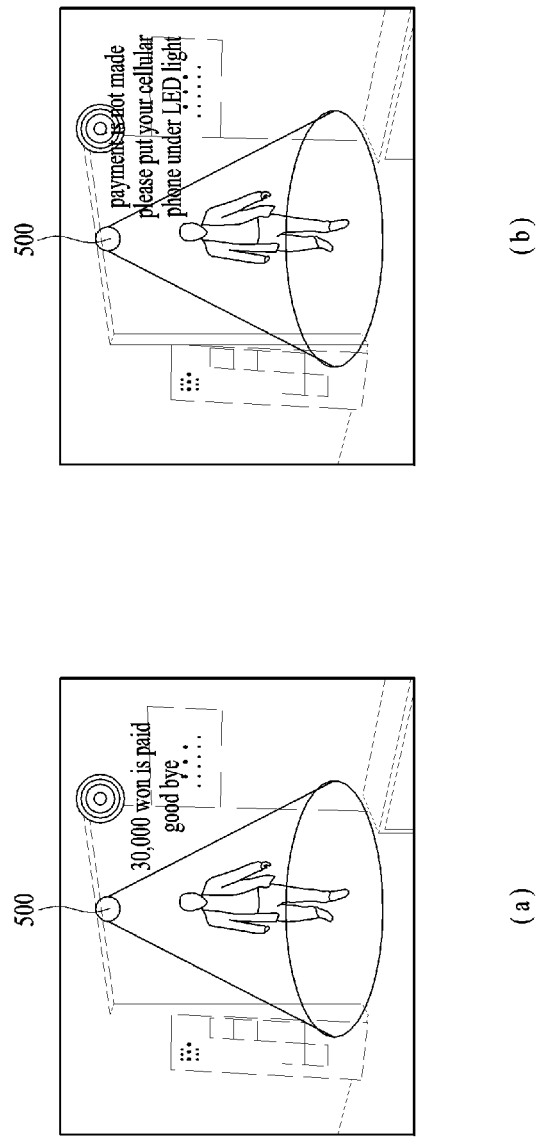

MOBILE TERMINAL

CROSS REFERENCE TO RELATED APPLICATIONS

This application is the National Phase of PCT International Application No. PCT/KR2015/008441, filed on Aug. 12, 2015, all of which are hereby expressly incorporated by reference into the present application.

TECHNICAL FIELD

The present invention relates to a mobile terminal enabling a user to more conveniently use the mobile terminal in consideration of the convenience of the user and a method of controlling therefor.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As the functions of the terminals are diversified, for example, the terminals are implemented in a form of a multimedia player equipped with complex functions such as capturing pictures or videos, playing music and video files, gaming, receiving broadcasting, and the like.

There are ongoing efforts to support and increase the functionality of mobile terminals. Such efforts include software and hardware improvements, as well as changes and improvements in the structural components which form the mobile terminal.

Visible light communication (also known as LI-FI) corresponds to a technology of performing short-range communication using visible light including digital data. Although the visible light communication has restrictions that communication is available only in a region to which light is reached and communication is unavailable if there is no light or an object blocks the light, the visible light communication is robust to security and can be used in such a place where the use of an electromagnetic wave is sensitive as a plane, a hospital, and the like.

Since modern people universally carry a mobile terminal at any place, it is necessary to have a method capable of performing visible light communication using the mobile terminal without any additional device.

DISCLOSURE OF THE INVENTION

Technical Tasks

An object of the present invention is to provide a method of utilizing a mobile terminal as a transmitting side and a receiving side of visible light communication.

Another object of the present invention is to provide a user experience and a user interface based on visible light communication.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a mobile terminal performing visible light communication using visible light outputted from a light which is turned on/off according to a predetermined condition includes a light receiving unit configured to receive visible light, a controller configured to extract data corresponding to the on/off of the light from the received visible light, and a display unit configured to display information based on the extracted data. In this case, the light receiving unit includes at least one selected from the group consisting of an illumination sensor, a first image sensor mounted on the front side of the mobile terminal, and a second image sensor mounted on the rear side of the mobile terminal and the controller controls the visible light communication to be performed using a sensor receiving visible light of the greatest signal strength among the illumination sensor, the first image sensor, and the second image sensor.

Advantageous Effects

According to one embodiment of the present invention, it is able to provide a method of utilizing a mobile terminal as a transmitting side and a receiving side of visible light communication.

According to one embodiment of the present invention, it is able to provide a user experience and a user interface based on visible light communication.

DESCRIPTION OF DRAWINGS

FIG. 2 is a flowchart for explaining an example of a method of performing visible light communication in a mobile terminal according to one embodiment of the present invention;

FIG. 3 is a diagram for explaining an example of a light receiving unit included in a mobile terminal according to one embodiment of the present invention;

FIG. 19 is a diagram for explaining a further different example of a method for a mobile terminal to provide a service using visible light communication according to one embodiment of the present invention.

BEST MODE

Mode for Invention

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
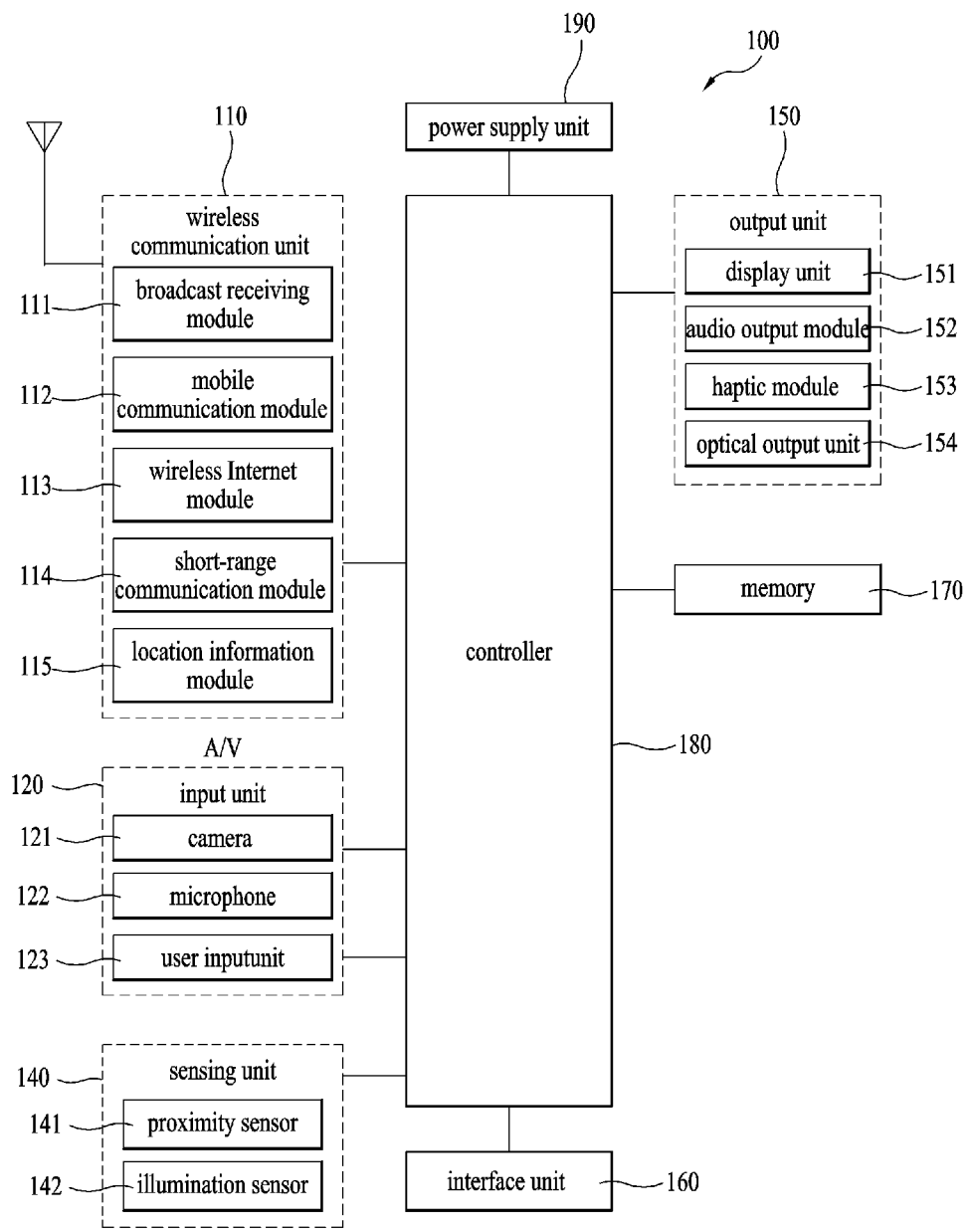
FIG. 1a is a block diagram of a mobile terminal in accordance with the present disclosure.
Figure 1B:
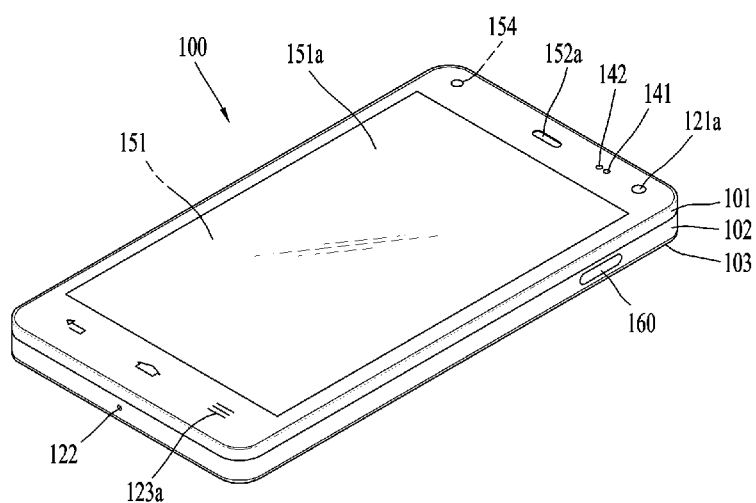
FIGS. 1b and 1c are conceptual views of one example of the mobile terminal, viewed from different directions.
Figure 1C:
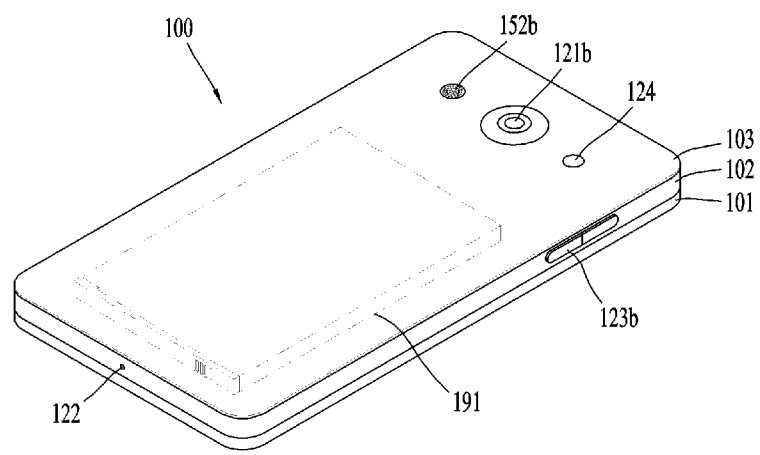

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or a function appropriate for a user in a manner of processing a signal, data, information and the like inputted or outputted via the aforementioned configuration elements or executing an application program stored in the memory 170.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least a part of the configuration elements can operate in a manner of cooperating with each other to implement an operation of a mobile terminal, control of the mobile terminal or a method of controlling the mobile terminal according to various embodiments described in the following. And, the operation of the mobile terminal, the control of the mobile terminal or the method of controlling the mobile terminal can be implemented on the mobile terminal by driving at least one or more application programs stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTHT™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 can include the display unit 151, the first and second audio output unit 152a/152b, the proximity sensor 141, the illumination sensor 142, the optical output unit 154, the first and second camera 121a/121b, the first and second operation unit 123a/123b, the microphone 122, the interface unit 160 and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In the following, examples for a method of performing visible light communication using a mobile terminal according to one embodiment of the present invention are explained with reference to FIGS. 2 to 19.

According to one embodiment of the present invention, when visible light communication is performed, a mobile terminal 100 may play a role of a light receiver receiving visible light outputted from an external light, which is turned on/off according to a predetermined condition. Or, the mobile terminal may play a role of a light emitter emitting visible light via an optical output module, which is turned on/off according to a predetermined condition. In this case, the external light can include an LED (light emitting diode).

FIG. 2 is a flowchart for explaining an example of a method of performing visible light communication in a mobile terminal according to one embodiment of the present invention.

Referring to FIG. 2, the controller 180 of the mobile terminal 100 can receive visible light from an external light via a light receiving unit [S210]. The light receiving unit can include at least one selected from the group consisting of an illumination sensor 142, a first image sensor 121a (or, a front camera), and a second image sensor 121b (or, a rear camera). Depending on an embodiment, the light receiving unit may include a plurality of illumination sensors.

If a visible light communication function is activated, the controller 180 activates the light receiving unit and may be able to receive visible light via the activated light receiving unit.

For example, the controller 180 can receive visible light using a sensor that receives visible light of the greatest signal strength among the illumination sensor 142, the first image sensor 121a, and the second image sensor 121b.

As a different example, the controller 180 can receive visible light using a sensor selected by a user from among the illumination sensor 142, the first image sensor 121a, and the second image sensor 121b.

Depending on an embodiment, When the controller 180 receives visible light using one sensor (first sensor) selected from among the illumination sensor 142, the first image sensor 121a, and the second image sensor 121b, if strength of a signal corresponding to the visible light received through the first sensor is weaker than a predetermined level, the controller 180 can receive visible light using a different sensor among the illumination sensor 142, the first image sensor 121a, and the second image sensor 121b.

Depending on an embodiment, if strength of a signal corresponding to visible light received through the light receiving unit is weaker than a predetermined level, the controller 180 can display a notification message on the display unit 151 to guide position adjustment of the mobile terminal 100.

The controller 180 extracts data corresponding to on/off of the external light from the received visible light [S220].

The visible light received through the light receiving unit includes data corresponding to on/off of the external light and the data may include digital information (1 or 0), The controller 180 measures the amount of light of the visible light received through the light receiving unit to extract the data included in the received light. For example, if the amount of light of the received light exceeds a predetermined level, the controller 180 can extract such a data as '1'. If the amount of light of the received light is less than the predetermined level, the controller can extract such a data as '0'.

The controller 180 can display information based on the extracted data on the display unit 151.

According to one embodiment of the present invention, the mobile terminal 100 can receive data using visible light communication and information based on the data can include a text, a graphic, an image, a video, an audio, and the like.

FIG. 3 is a diagram for explaining an example of a light receiving unit included in a mobile terminal according to one embodiment of the present invention.

The mobile terminal 100 receives visible light from an external light 300 via a light receiving unit and the light receiving unit can include at least one selected from the group consisting of an illumination sensor 142, a first image sensor 121a, and a second image sensor 121b. If a front side of the mobile terminal 100 is placed in a manner of facing the top, visible light is received via the illumination sensor 142 and/or the first image sensor 121a. If a rear side of the mobile terminal 100 is placed in a manner of facing the top, visible light can be received via the second image sensor 121b.

For example, the controller 180 can receive visible light using a sensor receiving visible light of the greatest signal strength among the illumination sensor 142, the first image sensor 121a, and the second image sensor 121b.

As a different example, the controller 180 can receive visible light using a sensor selected by a user from among the illumination sensor 142, the first image sensor 121a, and the second image sensor 121b.

Figure 4:
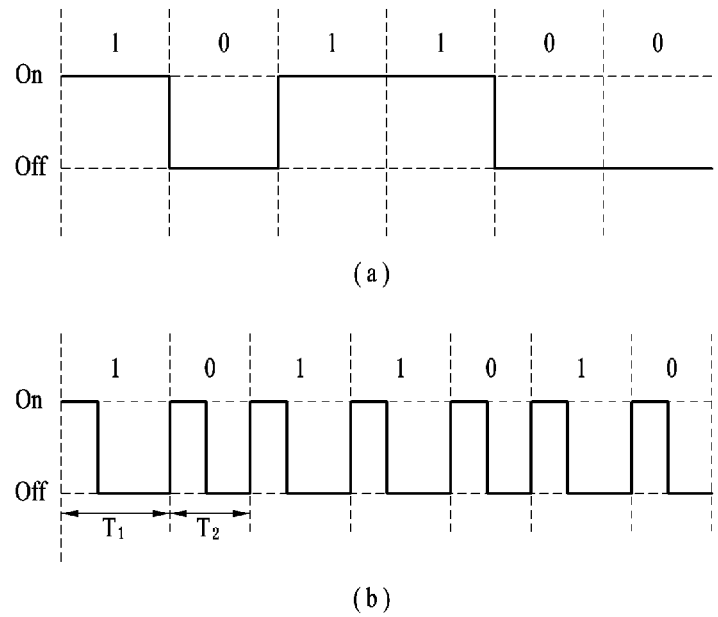
FIG. 4 is a diagram for explaining an example of a method for a mobile terminal to extract data from visible light according to one embodiment of the present invention.

FIG. 4 is a diagram for explaining an example of a method for a mobile terminal to extract data from visible light according to one embodiment of the present invention.

The controller 180 of the mobile terminal 100 can extract data from received visible light.

For example, referring to FIG. 4 (a), the controller 180 measures the amount of light of the visible light using a light receiving unit. If the amount of light exceeds a predetermined level, the controller 180 can extract such a data as '1'. If the amount of light is less than the predetermined level, the controller can extract such a data as '0'. The controller 180 can interpret the contents of the extracted data (digital information) according to a predetermined condition. And, the controller 180 can output information corresponding to the extracted data.

As a different example, referring to FIG. 4 (b), the controller 180 measures the amount of light of visible light using the light receiving unit. If a period of a pulse signal corresponding to the measured amount of light corresponds to T1, the controller 180 extracts such a data as '1'. If the period of the pulse signal corresponding to the measured amount of light corresponds to T2, the controller 180 can extract such a data as '0'. And, the controller 180 can output information corresponding to the extracted data.

A shape of a pulse signal corresponding to visible light, a method of extracting data from visible light, a method of interpreting information corresponding to an extracted data, and the like can be determined by a communication regulation that defines visible light communication.

According to one embodiment of the present invention, when visible communication is performed, if the mobile terminal 100 receives visible light from a plurality of external lights at the same time, it is able to improve a bandwidth. Regarding this, it shall be explained with reference to FIGS. 5 and 6 in the following.

Figure 5:
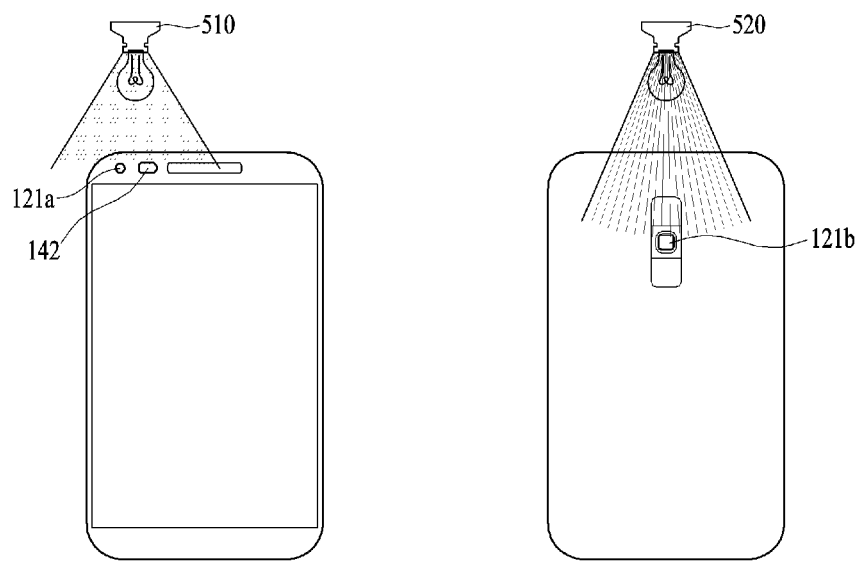
FIG. 5 is a diagram for explaining an example of a method for a mobile terminal to receive visible light from a plurality of external lights according to one embodiment of the present invention.

FIG. 5 is a diagram for explaining an example of a method for a mobile terminal to receive visible light from a plurality of external lights according to one embodiment of the present invention.

The mobile terminal 100 can practically receive visible light from at least two external lights 510/520.

For example, it may be able to receive visible light from a first external light 510 via the illumination sensor of the light receiving unit 142 and receive visible light from a second external light 520 via the second image sensor 121b of the light receiving unit.

As a different example, it may be able to receive visible light from the first external light 510 via the first image sensor 121a of the light receiving unit 142 and receive visible light from the second external light 520 via the second image sensor 121b of the light receiving unit.

Depending on an embodiment, if it is able to avoid interference between the visible lights outputted from each of a plurality of external lights, the visible lights can be respectively received via each of the first image sensor 121a and the illumination sensor 142 adjacent to each other and the visible lights can be received via each of a plurality of illumination sensors.

When visible light communication is performed, if a transmitting side outputs visible light via a plurality of lights and the mobile terminal 100 corresponding to a receiving side receives the visible light from a plurality of the lights, the amount of data transceived between the transmitting side and the mobile terminal increases and a bandwidth can be enlarged.

The controller of the mobile terminal can interpret data extracted from a plurality of visible lights by listing the data. The transmitting side of the visible light communication can transmit information on an order of the listed data via a plurality of the visible lights.

Figure 6:
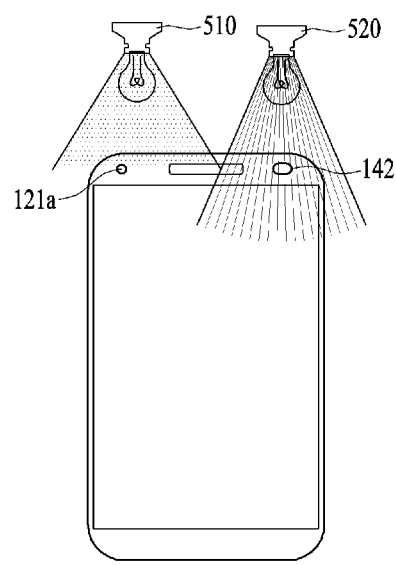
FIG. 6 is a diagram for explaining a different example of a method for a mobile terminal to receive visible light from a plurality of external lights according to one embodiment of the present invention.

FIG. 6 is a diagram for explaining a different example of a method for a mobile terminal to receive visible light from a plurality of external lights according to one embodiment of the present invention.

The mobile terminal 100 can practically receive visible light from at least two external lights 510/520.

For example, it may be able to receive visible light from the first external light 510 via the first image sensor 121a of the light receiving unit and receive visible light from the second external light 520 via the illumination sensor 142 of the light receiving unit.

The first image sensor 121a and the illumination sensor 142 can be implemented with a structure that visible light outputted from the first external light 510 and visible light outputted from the second external light 520 are not interfered with each other.

According to one embodiment of the present invention, when visible light communication is performed, the mobile terminal 100 may become a transmitting side that transmits data. Regarding this, it shall be described in the following with reference to FIG. 7.

Figure 7:
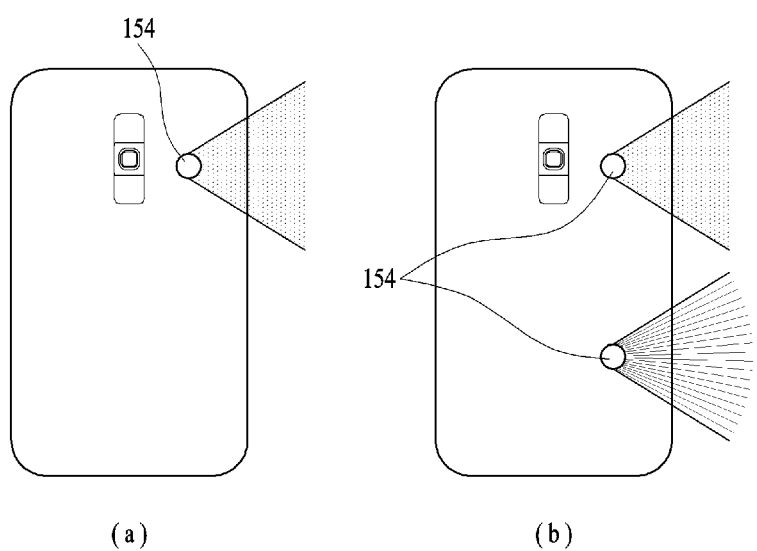
FIG. 7 is a diagram for explaining an example that a mobile terminal corresponds to a transmitting side when visible light communication is performed according to one embodiment of the present invention.

FIG. 7 is a diagram for explaining an example that a mobile terminal corresponds to a transmitting side when visible light communication is performed according to one embodiment of the present invention.

The controller 180 of the mobile terminal 100 generates a pulse signal of a predetermined frequency corresponding to a data to be transmitted by the controller and may be then able to output visible light via the optical output module 154 based on the generated pulse signal. The optical output module 154 can be mounted on the back of the mobile terminal 100, by which the present invention may be non-limited. The optical output module 154 can be configured by including an LED (light emitting diode). The controller 180 controls on/off of the optical output module 154 based on the generated pulse signal and the optical output module 154 can output the visible light when the optical output module is turned on.

As shown in FIG. 7 (a), the mobile terminal 100 may have a single optical output module 154. Or, as shown in FIG. 7

(b), the mobile terminal 100 may have a plurality of optical output modules 154. If there are many data to be transmitted, the controller 180 may practically output a plurality of visible lights at the same time using a plurality of the optical output modules 154.

For example, the controller 180 can generate the pulse signal of the predetermined frequency using a clock signal for generating a vibration data. If an event (answering a phone, receiving a text message, alarm, etc.) occurs in the mobile terminal 100, the controller 180 outputs a vibration data to a haptic module 153 to provide a vibration notification to a user. In this case, the controller 180 can control a vibration pattern, vibration strength, vibration time, and the like in response to the vibration data according to an event type, a user configuration, and the like. In particular, the pulse signal of the predetermined frequency can be generated using a signal for generating the vibration data. Specifically, the controller 180 multiplies a clock signal corresponding to a data (digital information) to be transmitted by a frequency signal for controlling a vibration pattern, vibration strength, vibration time, and the like to generate the pulse signal of the predetermined frequency.

As a different example, the controller 180 can generate the pulse signal of the predetermined frequency using an analog signal (e.g., a sine wave, a square wave, etc.) for generating audio data. The controller 180 can generate the pulse signal of the predetermined frequency by generating a waveform of a specific frequency using an analog signal of an audio chipset of the controller 180 and making the generated waveform of the specific frequency pass through a switching circuit. If the predetermined frequency is high and it is difficult to generate a preferred wave form of a frequency from the analog signal of the audio chipset, the controller 180 may use a frequency multiplication effect by mixing a left audio signal and a right audio signal with each other and performing half-wave rectification on a mixed signal.

As a further different example, the controller 180 can generate the pulse signal of the predetermined frequency using a clock signal for generating a vibration data and an analog signal for generating an audio data.

According to the present embodiment, it is able to perform visible light communication by utilizing original configuration modules of the mobile terminal 100 without additionally adding a separate configuration module to the mobile terminal 100.

Figure 8:
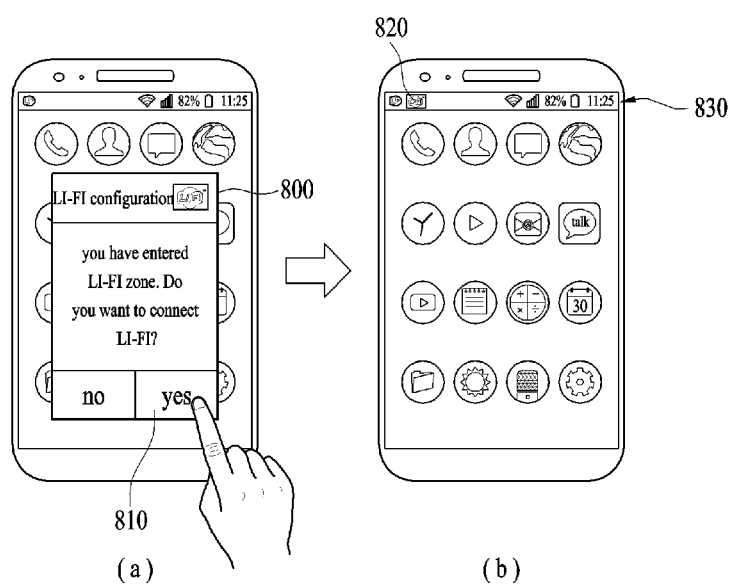
FIG. 8 is a diagram for explaining an example of a method for a mobile terminal to connect visible light communication according to one embodiment of the present invention.

FIG. 8 is a diagram for explaining an example of a method for a mobile terminal to connect visible light communication according to one embodiment of the present invention.

Referring to FIG. 8 (a), if the mobile terminal 100 is located at a region capable of performing visible light communication, the controller 180 of the mobile terminal 100 can display a message 800 on the display unit 151 to ask whether to connect to the visible light communication.

If the visible light communication is not connected, the light receiving unit may be in a deactivated state. Although the light receiving unit is activated, if the visible light communication is not connected, since it is not a mode appropriate for performing visible light communication, the controller 180 can determine whether or not the mobile terminal 100 is located at a region capable of performing the visible light communication based on information received via the wireless communication unit 110. For example, the controller 180 can determine whether or not the visible light communication is available based on a predetermined signal received from a transmitting side of the visible light communication via the mobile communication module 112, the wireless Internet module 113, and the short-range communication module 114. As a different example, if the mobile terminal 100 is located at a predetermined place, the controller 180 can determine that the visible light communication is available based on current location information of the mobile terminal 100 obtained via the location information module 115.

Or, depending on an embodiment, if a visible light communication function is activated by a user in advance, the controller 180 activates the light receiving unit. If visible light having the amount of light equal to or greater than a prescribed level is received via the activated light receiving unit, the controller 180 determines is as the mobile terminal 100 is located at a region capable of performing visible light communication and displays a message 800 on the display unit 151 to ask whether to connect to the visible light communication.

If a confirmation menu 810 of the message 800 is selected, the controller 180 connects the mobile terminal to the visible light communication and displays an indicator 820 on the display unit 151 to indicate that the mobile terminal is connected to the visible light communication. For example, the indicator 820 can be displayed on a notification bar located at the top of the display unit 151.

In the present embodiment, if the visible light communication is connected, it may indicate that the controller 180 controls the light receiving unit to be in a state capable of receiving a signal corresponding to visible light in case of performing the visible light communication. For example, if a confirmation menu 810 of the message 800 is selected, the controller 180 receives visible light via the light receiving unit and synchronizes a frequency of a pulse signal corresponding to the received visible light with a frequency of the light receiving unit.

Figure 9:
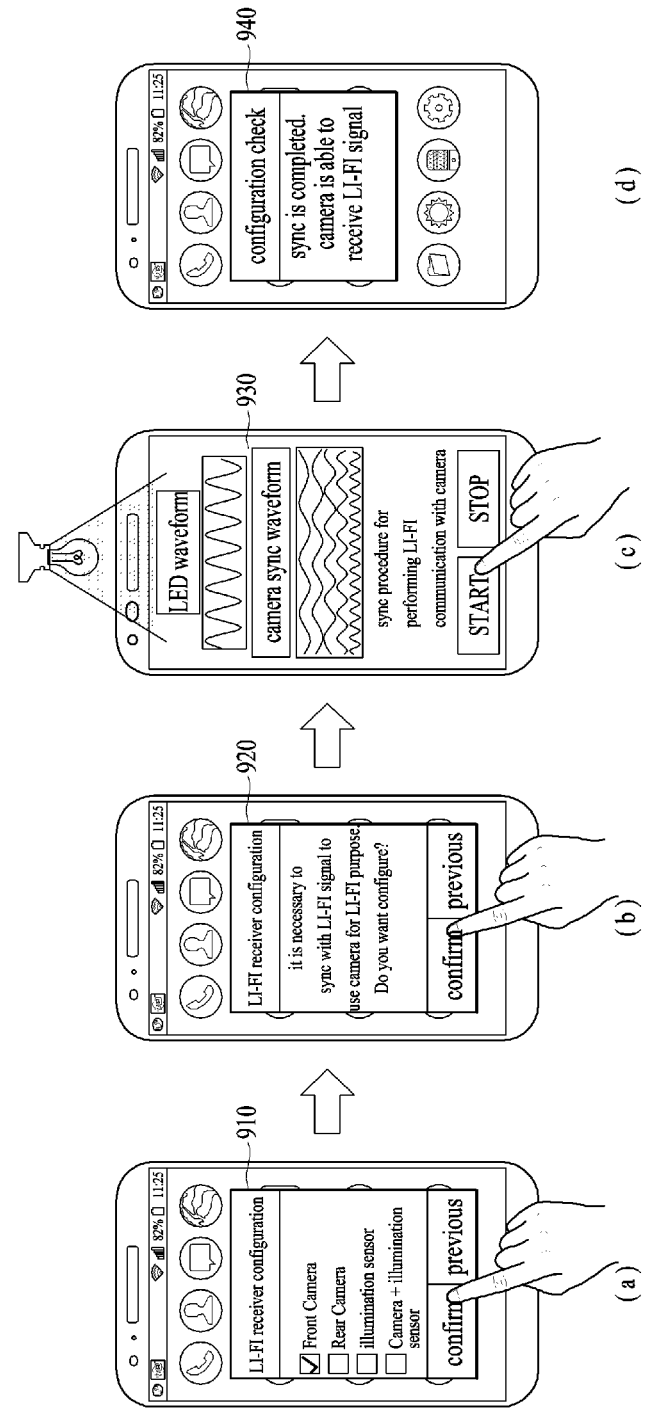
FIG. 9 is a diagram for explaining a different example of a method for a mobile terminal to connect visible light communication according to one embodiment of the present invention.

FIG. 9 is a diagram for explaining a different example of a method for a mobile terminal to connect visible light communication according to one embodiment of the present invention.

Referring to FIG. 9 (a), if a visible light communication function is activated, the controller 180 of the mobile terminal 100 can display a first GUI 910 including menu options capable of selecting a sensor to be used for the visible light communication from among the illumination sensor 142, the first image sensor 121a, and the second image sensor 121b included in the light receiving unit on the display unit 151. For example, the first GUI 910 can include a first menu option 911 capable of using visible light received via the first image sensor 121a for the visible light communication, a second menu option 912 capable of using visible light received via the second image sensor 121b for the visible light communication, a third menu option 913 capable of using visible light received via the illumination sensor 142 for the visible light communication, and a fourth menu option 914 capable of using visible lights received via the image sensor 120 and the illumination sensor 142 for the visible light communication.

Depending on an embodiment, the controller 180 activates the light receiving unit and may further include a menu option for recommending a sensor receiving visible light of the greatest signal strength among the illumination sensor 142, the first image sensor 121a, and the second image sensor 121b to a user.

In the present embodiment, assume that a user selects the first menu option 911 and then selects a confirmation menu 915 of the first GUI 910.

Figure 15:
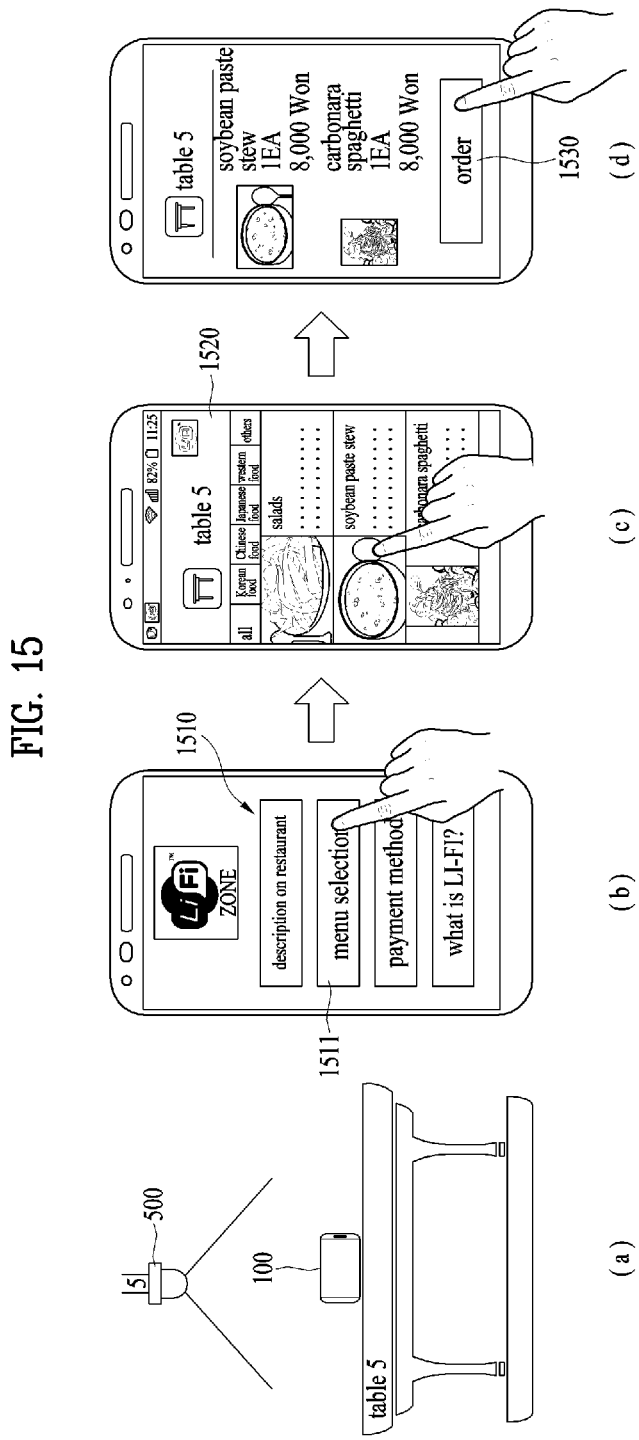
FIG. 15 is a diagram for explaining an example of a method for a mobile terminal to provide a service using visible light communication according to one embodiment of the present invention.

Referring to FIG. 15 (b), if the first menu option 911 is selected, the controller 180 activates the first image sensor 121a and may be able to display a second GUI 920 including a menu option for synchronizing a frequency of visible light received via the activated first image sensor 121a with a frequency of the first image sensor 121a on the display unit 151. Depending on an embodiment, although the visible light communication is performed via a specific configuration element of the light receiving unit according to a determination of the controller 180 without a selection of a user or the visible light communication is performed via a specific configuration element of the light receiving unit configured as default, the controller 180 can display the second GUI 920 on the display unit 151. Or, depending on an embodiment, the controller 180 can automatically perform a frequency synchronization procedure without displaying the second GUI 920 on the display unit 151.

The controller 180 can synchronize a frequency of visible light received via the first image sensor 121a with a frequency of the first image sensor 121a according to a command of selecting a confirmation menu 921 of the second GUI 920 to make the first image sensor 121a appropriately perform the visible light communication. Depending on an embodiment, as shown in FIG. 9 (c), the controller 180 can display a screen corresponding to a frequency synchronization procedure on the display unit 151.

Referring to FIG. 9 (d), if the frequency synchronization procedure is completed, the controller 180 can display a message 940 on the display unit 151 to indicate that visible light communication connection is completed. Then, the controller 180 can perform the visible light communication using the visible light received via the first image sensor 121a.

Meanwhile, according to one embodiment of the present invention, if strength of a signal corresponding to visible light received in the light receiving unit is weak, it may provide a guide to a user. Regarding this, it shall be described in the following with reference to FIGS. 10 to 15.

Figure 10:
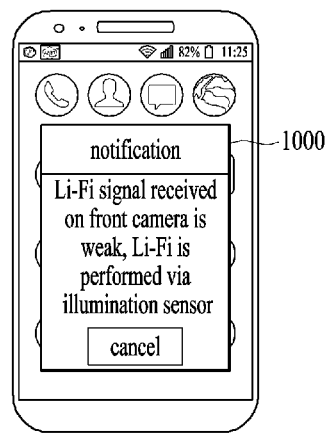
FIG. 10 is a diagram for explaining an example of a method for a mobile terminal to perform visible light communication using a second sensor different from a first sensor according to one embodiment of the present invention when strength of visible light received by the first senor is weaker than a predetermined level.

FIG. 10 is a diagram for explaining an example of a method for a mobile terminal to perform visible light communication using a second sensor different from a first sensor according to one embodiment of the present invention when strength of visible light received by the first senor is weaker than a predetermined level.

The controller 180 of the mobile terminal 100 can perform visible light communication using visible light received via the first image sensor 121a. The first image sensor 121a may correspond to a sensor selected by a user from among configuration elements included in the light receiving unit or a sensor of the greatest signal strength corresponding to a received visible light among the configuration elements included in the light receiving unit.

When the controller 180 performs visible light communication using the first image sensor 121a, if strength of a signal corresponding to visible light received via the first image sensor 121a becomes less than a predetermined level, the controller 180 can perform the visible light communication using a random sensor (e.g., the illumination sensor 142) among the illumination sensor 142 and the second image sensor 121a included in the light receiving unit. For example, when the controller 180 performs the visible light communication using the first image sensor 121a, if strength of a signal corresponding to visible light received via the first image sensor 121a becomes less than a predetermined level, the controller 180 activates the illumination sensor 142 and the second image sensor 121b and can perform the visible light communication using the illumination sensor 142 receiving visible light of which signal strength is stronger among the activated illumination sensor 142 and the second image sensor 121b.

Depending on an embodiment, if a sensor receiving visible light is changed, the controller 180 can display a notification message 1000 on the display unit 151 to notify that the sensor has changed.

Figure 11:
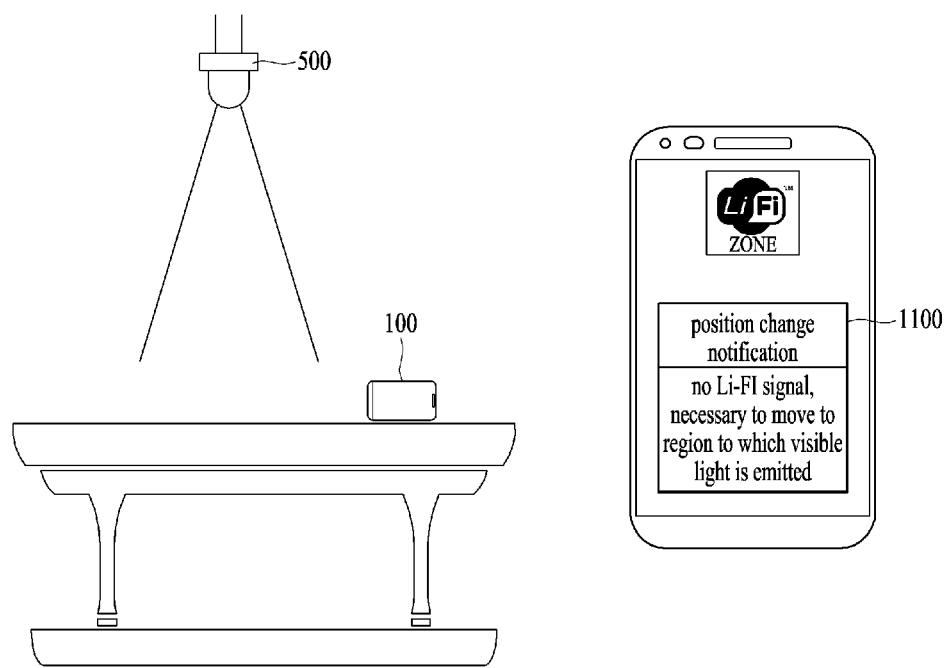
FIG. 11 is a diagram for explaining an example of a method for a mobile terminal to induce a position change of the mobile terminal according to one embodiment of the present invention when strength of visible light received in the mobile terminal is weaker than a predetermined level.

FIG. 11 is a diagram for explaining an example of a method for a mobile terminal to induce a position change of the mobile terminal according to one embodiment of the present invention when strength of visible light received in the mobile terminal is weaker than a predetermined level.

Although a visible light communication function is activated and the light receiving unit is activated as well, if no visible light is received via the light receiving unit or strength of a signal corresponding to visible light is less than a predetermined level, the controller 180 of the mobile terminal 100 can display a guide message 1100 on the display unit 151 to guide a position adjustment of the mobile terminal 100. A user can recognizes that the mobile terminal 100 has deviated from a light field of an external light 500 via the guide message 1100 and can adjust a position of the mobile terminal 100.

Figure 12:
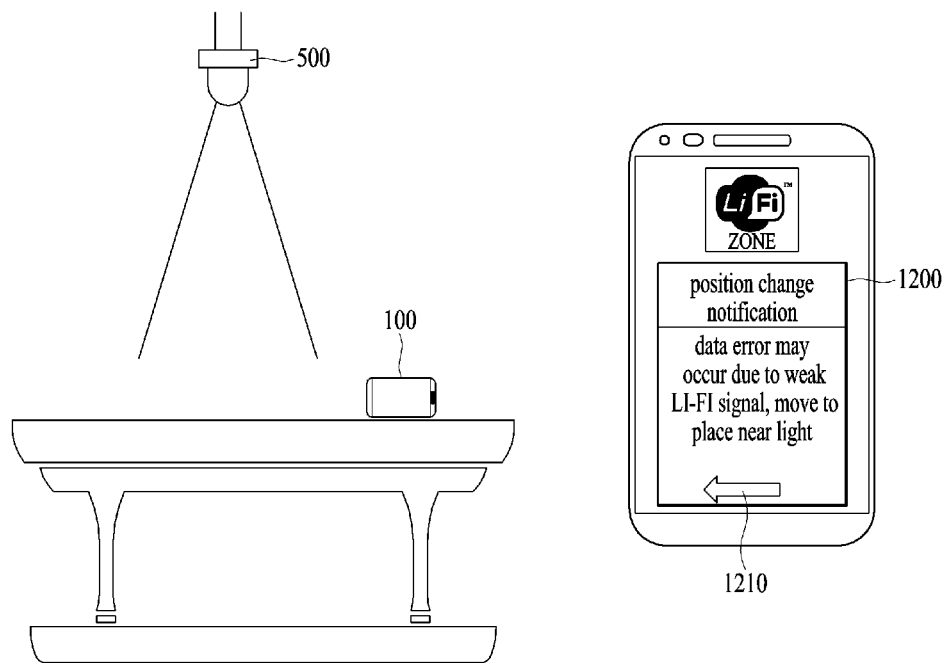
FIG. 12 is a diagram for explaining a different example of a method for a mobile terminal to induce a position change of the mobile terminal according to one embodiment of the present invention when strength of visible light received in the mobile terminal is weaker than a predetermined level.

FIG. 12 is a diagram for explaining a different example of a method for a mobile terminal to induce a position change of the mobile terminal according to one embodiment of the present invention when strength of visible light received in the mobile terminal is weaker than a predetermined level.

If strength of a signal corresponding to visible light received via the light receiving unit is less than a predetermined level, the controller 180 of the mobile terminal 100 can display a guide message 1200 on the display unit 151 to guide a position adjustment of the mobile terminal 100.

The controller 180 senses an incidence direction of the visible light received via the light receiving unit and may display an indicator 1210 in the guide message 1200 to indicate a moving direction of the mobile terminal 100 based on the sensed incidence direction. For example, the indicator 1210 may correspond to an arrow indicating the moving direction of the mobile terminal 100 based on the sensed incidence direction.

Figure 13:
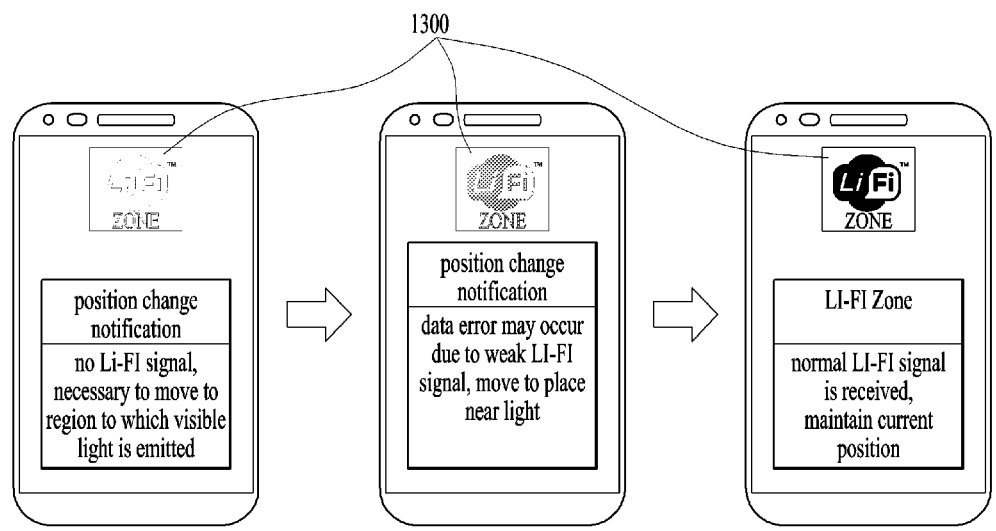
FIG. 13 is a diagram for explaining a change of an indicator indicating strength of a signal corresponding to visible light received in a mobile terminal according to one embodiment of the present invention.

FIG. 13 is a diagram for explaining a change of an indicator indicating strength of a signal corresponding to visible light received in a mobile terminal according to one embodiment of the present invention.

The controller 180 of the mobile terminal 100 can display an indicator 1300 on the display unit 151 in response to strength of a signal corresponding to visible light received via the light receiving unit. The indicator 1300 may change at least one selected from the group consisting of a size, a shape, a color, sharpness, and transparency according to a change of the strength of the signal corresponding to the received visible light.

Figure 14:
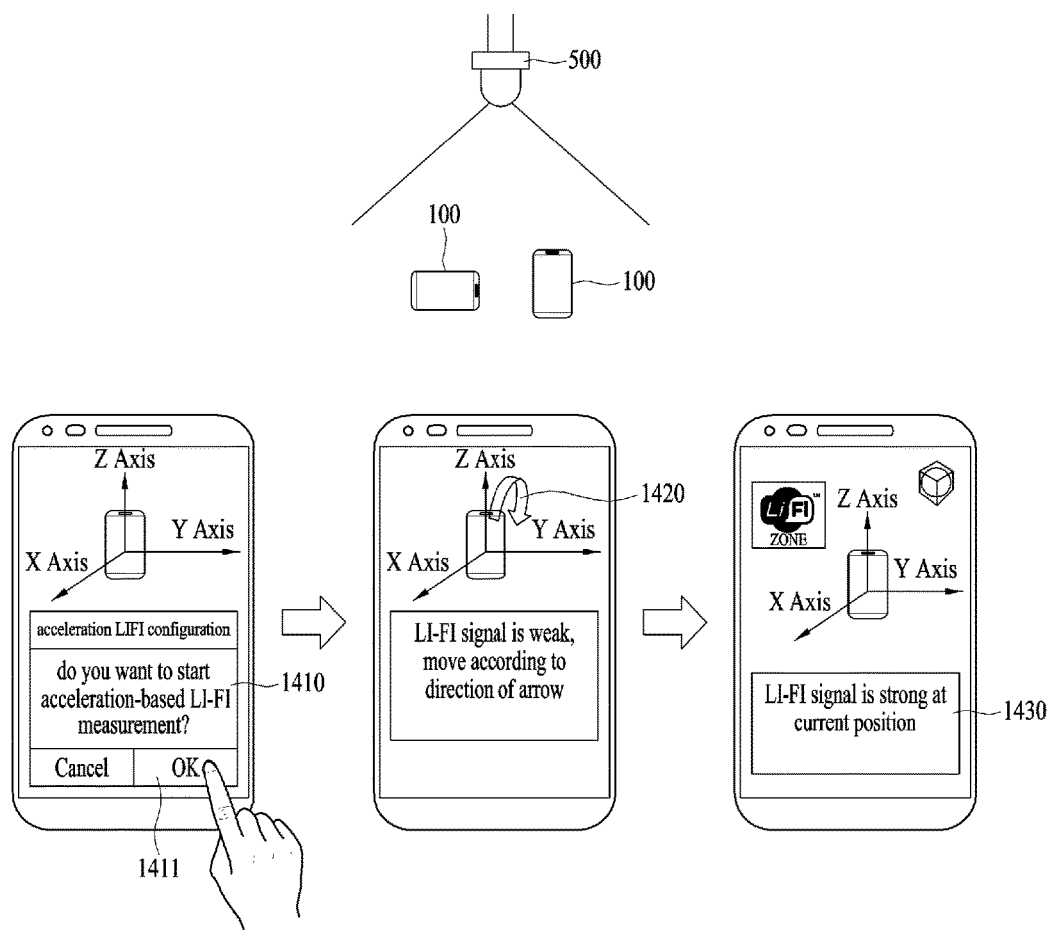
FIG. 14 is a diagram for explaining a further different example of a method for a mobile terminal to induce a position change of the mobile terminal according to one embodiment of the present invention when strength of visible light received in the mobile terminal is weaker than a predetermined level.

FIG. 14 is a diagram for explaining a further different example of a method for a mobile terminal to induce a position change of the mobile terminal according to one embodiment of the present invention when strength of visible light received in the mobile terminal is weaker than a predetermined level.

Although the mobile terminal 100 is located within a light field of an external light 500, if the light receiving unit does not face the external light 500, the mobile terminal is unable to perform visible light communication depending on an angle of the mobile terminal 100. Hence, the controller 180 senses a current status of the mobile terminal 100 and may be able to provide a guide for inducing a position change of the mobile terminal 100 based on the sensed current status of the mobile terminal 100. In this case, the current status of the mobile terminal 100 may correspond to an angle of the mobile terminal 100 on the basis of a horizontal line, an inclination of the mobile terminal 100, a face-up state that the front side of the mobile terminal 100 is heading to the top, a face-down state that the front side of the mobile terminal 100 is heading to the bottom, and the like. The controller 180 can sense the current status of the mobile terminal 100 based on data sensed by an acceleration sensor included in the sensing unit 140.

For example, the controller 180 can display a GUI 1410 on the display unit 151 to receive a command for receiving a guide based on the data sensed by the acceleration sensor. Depending on an embodiment, if strength of a signal corresponding to visible light received via the light receiving unit is less than a predetermined level, the controller 180 can provide the guide based on the data sensed by the acceleration sensor to a user without displaying the GUI 1410. And, depending on an embodiment, if the visible light communication function is activated, it may be able to configure a user to receive the guide based on the data sensed by the acceleration sensor in real time.

If a command for selecting a confirmation menu 1411 of the GUI 1410 is sensed, the controller 180 activates the acceleration sensor and can display an indicator 1420 on the display unit 151 to indicate a rotation direction, an inclination angle, and the like of the mobile terminal 100 based on data sensed by the acceleration sensor.

Depending on an embodiment, when the current status of the mobile terminal 100 is changed according to the guide provided based on the data sensed by the acceleration sensor, if strength of a signal corresponding to visible light received via the light receiving unit exceeds a predetermined level, the controller 180 can display a message 1430 on the display unit 151 to indicate that receiving sensitivity of the signal is good.

In the following, examples of methods for a mobile terminal 100 to apply visible light communication are explained with reference to FIGS. 15 to 19. In the present specification, a case of providing a service in a restaurant via visible light communication with the mobile terminal 100 is explained, by which the present invention may be non-limited.

FIG. 15 is a diagram for explaining an example of a method for a mobile terminal to provide a service using visible light communication according to one embodiment of the present invention.

Referring to FIG. 15 (a), the controller 180 of the mobile terminal activates the light receiving unit and can receive visible light outputted from an external light 500 via the activated light receiving unit. Then, the controller 180 can extract data corresponding to on/off of the external light 500 from the received visible light.

The extracted data can include information for identifying the external light 500 and information of a menu (e.g., food menu) usable in a space at which the external light 500 is located. The information for identifying the external light 500 can be mapped with information of a specific table. Mapping data between information for identifying each of external lights and a specific table can be stored in a server controlling the external light 500.

Referring to FIG. 15 (b), the controller 180 can display a GUI 1510 including at least one or more menu options capable of being used in a space at which the external light 500 is located (e.g., a space at which a specific table mapped to the external light 500 is located) based on the extracted data.

If a menu option 1511 for selecting a food menu is selected from the GUI 1510, as shown in FIG. 15 (c), the controller 180 can display a GUI 1520 including information on food menus, which are provided in the space at which the external light 500 is located, on the display unit 151.

If information on specific food is selected via the GUI 1510, as shown in FIG. 15 (d), the controller 180 can display a menu option 1530 for ordering the food on the display unit 151.

The controller 180 can transmit a signal corresponding to the selected menu option 1530 to an external device or an external server via the wireless communication unit 110 according to a command for selecting the menu option 1530. In this case, the external device or the external server corresponds to a transmitting side in visible light communication. In particular, the external device or the external server may correspond to a main entity controlling on/off of the external light 500. Depending on an embodiment, the controller 180 generates a pulse signal of a predetermined frequency including data corresponding to the selected menu option 1530 and may emit visible light via the optical output module 154 based on the pulse signal. In particular, the mobile terminal corresponds to a transmitting side of visible light communication and can transmit the pulse signal of the predetermined frequency including the data corresponding to the selected menu option 1530 to the external device or the external server.

Figure 16:
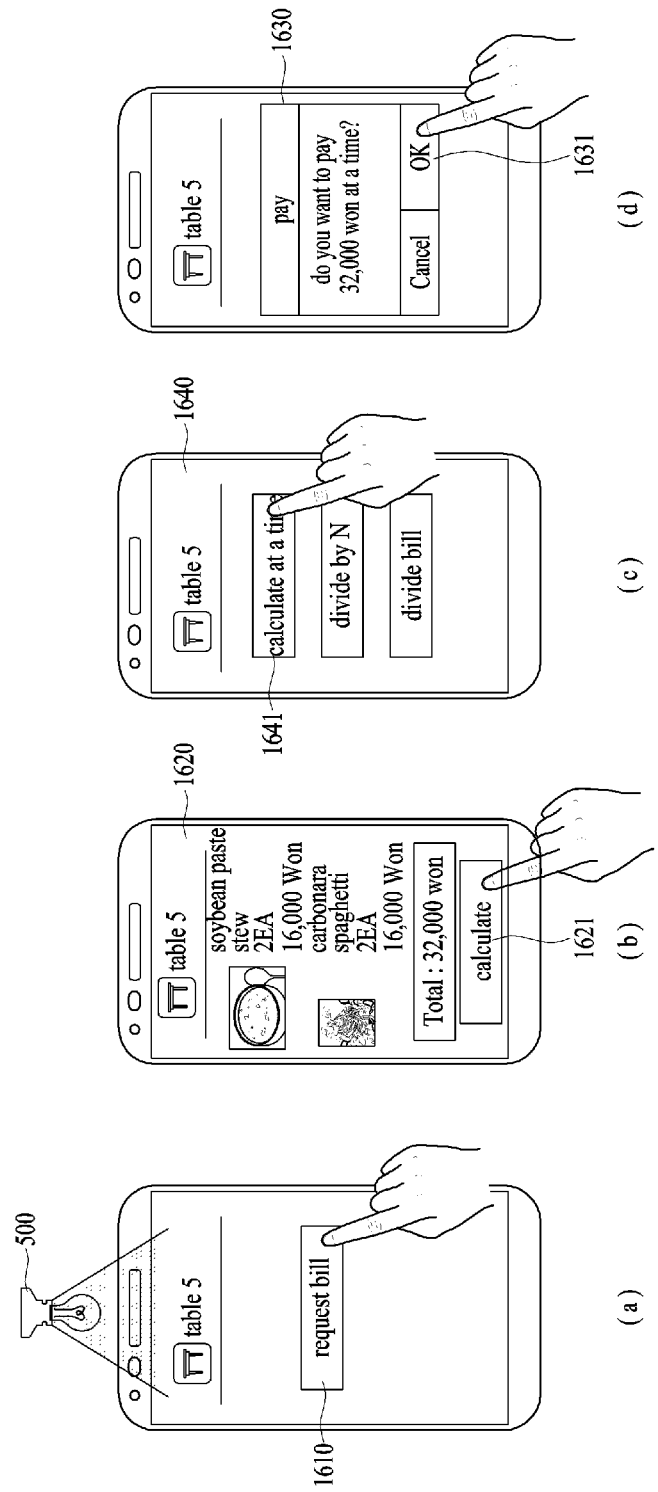
FIG. 16 is a diagram for explaining a different example of a method for a mobile terminal to provide a service using visible light communication according to one embodiment of the present invention.

FIG. 16 is a diagram for explaining a different example of a method for a mobile terminal to provide a service using visible light communication according to one embodiment of the present invention. Explanation on contents overlapped with the contents mentioned earlier in FIG. 15 is omitted.

Referring to FIG. 16 (a), the controller 180 of the mobile terminal 100 can display a menu option 1610 for requesting a bill for ordered food on the display unit 151 based on data extracted from visible light received by the light receiving unit.

The controller 180 can transmit a signal for requesting the bill to the external device or the external server via the wireless communication unit 110 or the optical output module 154 according to a command for selecting the menu option 1610.

Referring to FIG. 16 (b), the controller 180 of the mobile terminal 100 can display a GUI 1620 including information on the bill for the ordered food on the display unit 151 based on the data extracted from the visible light received by the light receiving unit.

If a command for selecting a calculate menu from the GUI 1620 is sensed, as shown in FIG. 16 (d), the controller 180 can display a message 1630 for checking payment of the ordered food on the display unit 151.

Depending on an embodiment, if the command for selecting the calculate menu from the GUI 1620 is sensed, as shown in FIG. 16 (c), the controller 180 can display a GUI 1640 enabling a user to select a payment method on the display unit 151 before the message 1630 for checking the payment of the ordered food is displayed.

For example, a user may select a method from among a method of paying for ordered food at a time, a method of paying for ordered food by dividing a bill according to a head count, and a method of paying for ordered food by randomly dividing a bill via the GUI 1640.

In the present embodiment, assume that a menu option for paying for ordered food at a time is selected via the GUI 1640.

Referring to FIG. 16 (d), if a command for selecting OK menu 1631 from the message 1630 is sensed, the controller 180 can transmit card information for paying for ordered food to an external payment terminal via the wireless communication unit 110 or the optical output module 154. The card information may correspond to information registered at the mobile terminal in advance via a payment application installed in the mobile terminal 100.

Figure 17:
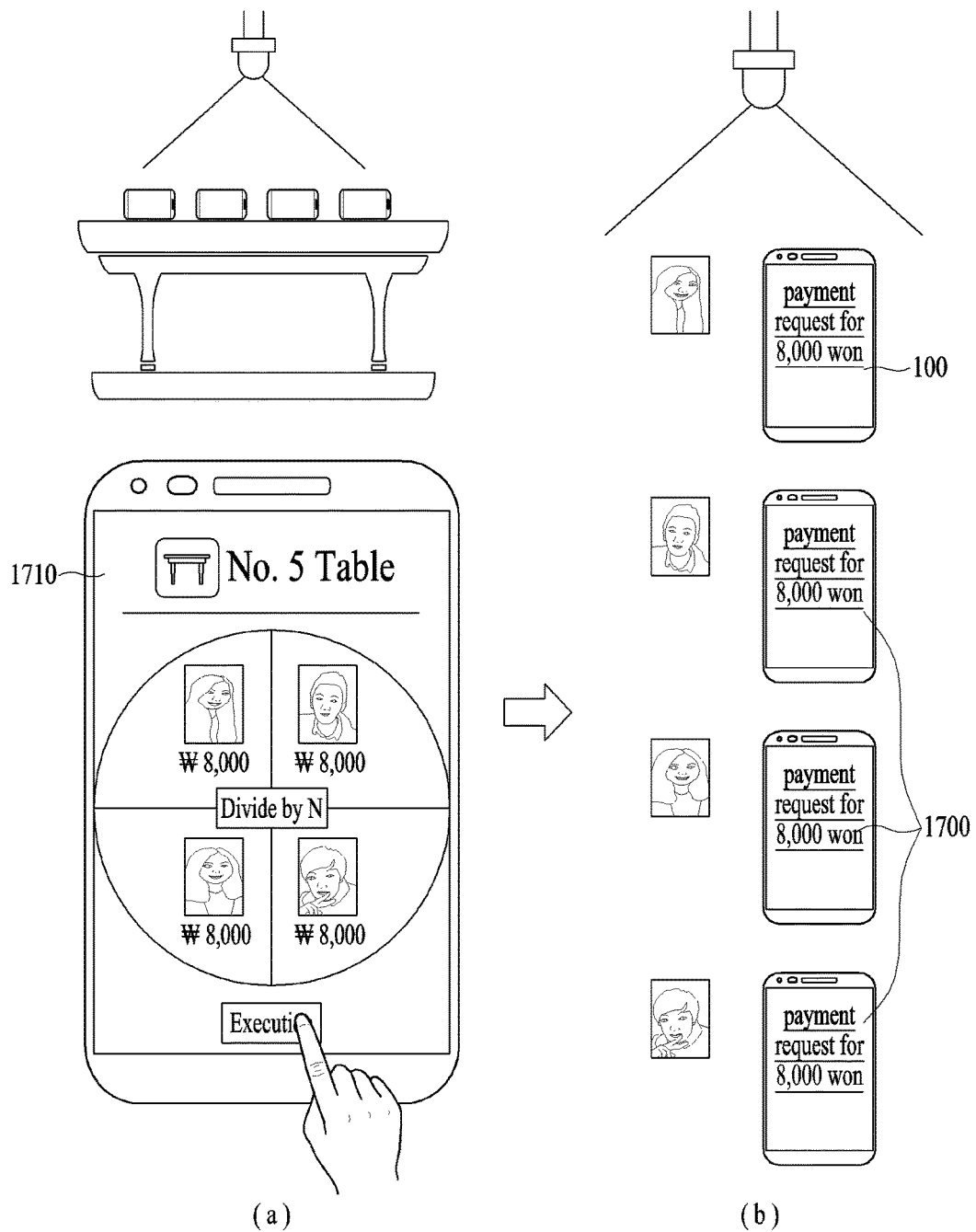
FIG. 17 is a diagram for explaining a further different example of a method for a mobile terminal to provide a service using visible light communication according to one embodiment of the present invention.

FIG. 17 is a diagram for explaining a further different example of a method for a mobile terminal to provide a service using visible light communication according to one embodiment of the present invention. Explanation on content overlapped with the contents mentioned earlier in FIG. 16 is omitted.

If a menu option for paying for ordered food by dividing a bill according to a head count is selected via a GUI 1640 shown in FIG. 16 (c), the controller 180 of the mobile terminal 100 can display a GUI 1710 shown in FIG. 17 (a) on the display unit 151.

For example, if a command for selecting a menu option for paying for ordered food by dividing a bill by a head count of N is sensed, the controller 180 can transmit information on external devices 1700 paired with the short-range communication module 114 to an external device or an external server connected with visible light communication via the wireless communication unit 110 or the optical output module 154. Then, the external device or the external server connected with the mobile terminal 100 via the visible light communication may emit visible light including information on a bill divided by N corresponding to the sum of the mobile terminal 100 and the external devices 1700. The controller 180 receives the emitted visible light and can display the GUI 1710 on the display unit 151 based on data extracted from the visible light.

As a different example, if light receiving unit and optical output module of the external devices 1700 are activated, the external device or the external server connected with the mobile terminal 100 via the visible light communication transmits visible light to the external devices 1700 to request device information. The external devices 1700 can emit visible light including the device information via the optical output module. The external device or the external server corresponding to a main transmitting side of the visible light communication can emit visible light including information on a bill divided by N corresponding to the sum of the mobile terminal 100 and the external devices 1700.

Referring to FIG. 17 (b), the mobile terminal 100 and each of the external devices 1700 receive the visible light including the information on the bill divided by N corresponding to the sum of the mobile terminal 100 and the external devices 1700 and can display a message for requesting payment of prescribed amount on the display unit based on information extracted from the received visible light.

Figure 18:
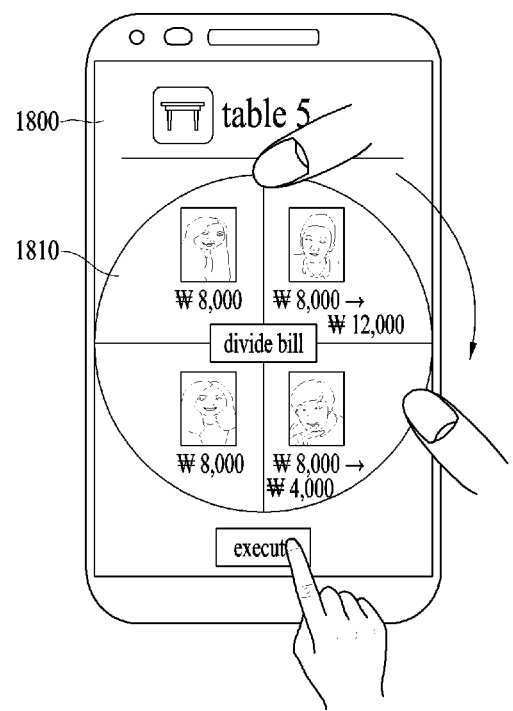
FIG. 18 is a diagram for explaining a further different example of a method for a mobile terminal to provide a service using visible light communication according to one embodiment of the present invention.

FIG. 18 is a diagram for explaining a further different example of a method for a mobile terminal to provide a service using visible light communication according to one embodiment of the present invention. Explanation on contents overlapped with the contents mentioned earlier in FIG. 17 is omitted.

If a menu option for paying for ordered food by dividing a bill according to a head count is selected via a GUI 1640 shown in FIG. 16 (c), the controller 180 of the mobile terminal 100 can display a GUI 1800 on the display unit 151 based on the information included in the visible light received from the external device or the external server connected with the mobile terminal 100 via the visible light communication. As mentioned earlier in FIG. 17, the GUI 1800 can include information on a bill divided by N corresponding to the sum of the mobile terminal 100 and the external devices 1700.

A user can adjust an amount of money assigned to a specific person via the GUI 1800. The controller 180 can sense a first command for adjusting the amount of money assigned to the specific person via the GUI 1800. For example, the first command corresponds to a command for widening a region corresponding to the specific person among a region 1810 included in the GUI 1800. The first command may correspond to a touch input dragging a touch touched on a point of the specific region 1810 in a prescribed direction.

Since the remaining part is similar to the contents mentioned earlier in FIG. 17, explanation on the part is omitted.

FIG. 19 is a diagram for explaining a further different example of a method for a mobile terminal to provide a service using visible light communication according to one embodiment of the present invention.

According to the present embodiment, a user can check whether or not payment for ordered food is made at a space at which a service is provided by emitting predetermined visible light via the optical output module 154 of the mobile terminal 100.

For example, referring to FIG. 19 (a), a user can pass through the entrance while carrying the mobile terminal 100 in a manner that the optical output module 154 of the mobile terminal 100 faces the external light 500 after the meal. In this case, the controller 180 of the mobile terminal 100 can emit first visible light via the optical output module 154 in response to a signal requested to check whether or not payment is made. The external device or the external server connected with the mobile terminal 100 via the visible light communication receives the visible light and can determine whether or not the payment for the ordered food is made based on information included in the received visible light. If the payment for the ordered food is completed, the external device or the external server connected with the mobile terminal 100 via the visible light communication can output audio data corresponding to a payment completion confirmation message.

As a different example, referring to FIG. 19 (b), when the external device or the external server connected with the mobile terminal 100 via the visible light communication determines whether or not the payment for the ordered food is made based on the information included in the received visible light, if the payment is not made or is not approved, the external device or the external server can output audio data corresponding to a message indicating that the payment is not completed. Then, the controller 180 of the mobile terminal 100 can transmit card information to an external payment terminal via the wireless communication unit 110 or the optical output module 154 to make payment for the ordered food. By doing so, payment for the ordered food can be completed.

According to the aforementioned embodiments, it is able to provide a method of utilizing the mobile terminal as a transmitting side and a receiving side of visible light communication and it is able to provide user experience and user interface based on the visible light communication.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

INDUSTRIAL APPLICABILITY

The present invention relates to a mobile terminal and is industrially usable.

What is claimed is:

1. A mobile terminal performing visible light communication using visible light outputted from a light which is turned on/off according to a predetermined condition, comprising:
   a light receiving unit configured to receive visible light;
   a controller configured to extract data corresponding to the on/off of the light from the received visible light; and
   a display unit configured to display information based on the extracted data,
   wherein the light receiving unit comprises at least one selected from a group consisting of an illumination sensor, a first image sensor mounted on a front side of the mobile terminal, and a second image sensor mounted on a rear side of the mobile terminal, and
   wherein the controller is configured to perform the visible light communication using a sensor receiving visible light of a greatest signal strength among the illumination sensor, the first image sensor, and the second image sensor.

2. The mobile terminal of claim 1, wherein if a visible light communication function is activated, the controller activates the light receiving unit.

3. The mobile terminal of claim 2, wherein the controller receives visible light via the activated light receiving unit and synchronizes a frequency of the received visible light with a frequency of the light receiving unit.

4. The mobile terminal of claim 3, wherein if the light receiving unit is activated, the controller displays a GUI containing a menu option for synchronizing the frequency of the received visible light with the frequency of the light receiving unit on the display unit.

5. The mobile terminal of claim 1, wherein the controller displays a GUI containing a menu option for selecting a sensor to be used for the visible light communication from among the illumination sensor, the first image sensor, and the second image sensor on the display unit.

6. The mobile terminal of claim 5, wherein the controller performs the visible light communication using visible light received by the sensor selected via the GUI.

7. The mobile terminal of claim 1, wherein the controller performs the visible light communication using the sensor receiving the visible light of the greatest signal strength among the illumination sensor, the first image sensor, and the second image sensor, and
   wherein if a strength of a signal corresponding to the visible light received by the sensor used in the visible light communication is less than a predetermined level, the controller controls the visible light communication to be performed using a different sensor among the illumination sensor, the first image sensor, and the second image sensor.

8. The method of claim 1, wherein the extracted data comprises information for identifying the light and information on a menu capable of being used in a space at which the light is located, and
   wherein the controller displays a GUI containing at least one or more menu options capable of being used in the space at which the light is located on the display unit.

9. The method of claim 8, further comprising a wireless communication unit configured to perform wireless communication with an external device or an external server,
   wherein the controller transmits a signal corresponding to a selected menu option to the external device or the external server via the wireless communication unit according to a command for selecting the menu option through the GUI.

10. The mobile terminal of claim 9, wherein the wireless communication unit comprises an optical output module, and
   wherein the controller generates a pulse signal of a predetermined frequency in response to the selected menu option and emits visible light via the optical output module based on the generated pulse signal.

11. The mobile terminal of claim 10, wherein the controller generates the pulse signal of the predetermined frequency using at least one of a clock signal for generating a vibration data and an analog signal for generating audio data.

12. The mobile terminal of claim 10, wherein the controller controls the optical output module to be turned on/off based on the generated pulse signal.

13. The mobile terminal of claim 1, wherein if strength of a signal of visible light received via the light receiving unit is less than a predetermined level, the controller displays a notification message on the display unit to guide a position adjustment of the mobile terminal.

14. The mobile terminal of claim 1, wherein if strength of a signal of visible light received via the light receiving unit is less than a predetermined level, the controller senses an incidence direction of the visible light received via the light receiving unit and displays an indicator on the display unit to indicate a moving direction of the mobile terminal.

15. The mobile terminal of claim 2, wherein when the visible light communication function and the light receiving unit are activated, if no visible light is received via the light receiving unit, the controller displays a notification message on the display unit to guide a position adjustment of the mobile terminal.

16. The mobile terminal of claim 14, further comprising an acceleration sensor, wherein if the strength of the signal of the visible light received via the light receiving unit is less than the predetermined level, the controller activates the acceleration sensor and displays an indicator on the display unit to indicate a rotation direction of the mobile terminal based on data sensed by the acceleration sensor.

17. The mobile terminal of claim 16, wherein the controller displays a GUI on the display unit to receive a command for receiving a guide based on the data sensed by the acceleration sensor, and wherein if the command is received via the GUI, the controller activates the acceleration sensor.

18. The mobile terminal of claim 1, wherein the extracted data comprises payment request information of a specific bill, and wherein the controller displays a menu option for paying the specific bill based on the extracted data, executes a payment application according to a command for selecting the menu option for paying the specific bill, and controls information for paying the specific bill to be transmitted to an external payment server using financial information at the payment application.

19. The mobile terminal of claim 1, wherein the extracted data further comprises payment request information of a specific bill and information on each mobile terminal located within a range of the visible light outputted from the light, and wherein the controller displays a first menu option for full payment of the specific bill and a second menu option for paying the specific bill by dividing the specific bill on the display unit based on the extracted data and controls payment request information on a bill resulted from dividing the specific bill by a predetermined condition to be transmitted to each mobile terminal corresponding to the information on each mobile terminal according to a command for selecting the second menu option.

20. The mobile terminal of claim 19, wherein the controller displays a GUI containing information for identifying each mobile terminal and information on the bill corresponding to each mobile terminal on the display unit based on the information on each mobile terminal according to the command for selecting the second menu option.

* * * * *